(No Model.)

G. S. CROSBY.
TOY VEHICLE TEAM.

No. 330,298. Patented Nov. 10, 1885.

Witnesses
S. S. Williamson
Charles E. Stanton

Inventor
George S. Crosby
By Smith & Hubbard
Attys

N. PETERS, Photo-Lithographer, Washington, D. C.

UNITED STATES PATENT OFFICE.

GEORGE S. CROSBY, OF BROOKLYN, NEW YORK.

TOY-VEHICLE TEAM.

SPECIFICATION forming part of Letters Patent No. 330,298, dated November 10, 1885.

Application filed March 14, 1885. Serial No. 158,776. (No model.)

*To all whom it may concern:*

Be it known that I, GEORGE S. CROSBY, a citizen of the United States, residing at Brooklyn, in the county of Kings and State of New York, have invented certain new and useful Improvements in Toy-Vehicle Teams; and I do hereby declare the following to be a full, clear, and exact description of the invention, such as will enable others skilled in the art to which it appertains to make and use the same.

My invention relates to certain novel and useful improvements in toy vehicles, but more especially to that class of vehicles designed for a pair of horses, oxen, &c., and has for its object to so connect the animals to the pole as to permit of ready detachment, while at the same time great ease and uniformity are given to the movements of the vehicle and animals attached, more particularly in turning around; and with these ends in view my invention consists in the details of construction of elements hereinafter fully explained, and then specifically designated by the claims.

In order that those skilled in the art to which my invention appertains may fully understand my invention, I will proceed to describe the same in detail, referring by letter to the accompanying drawings, forming a part of this specification, in which—

Figure 1:
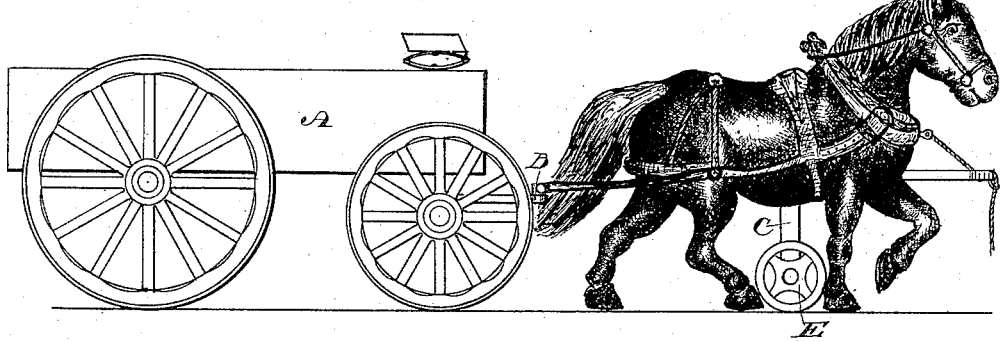
Figure 2:
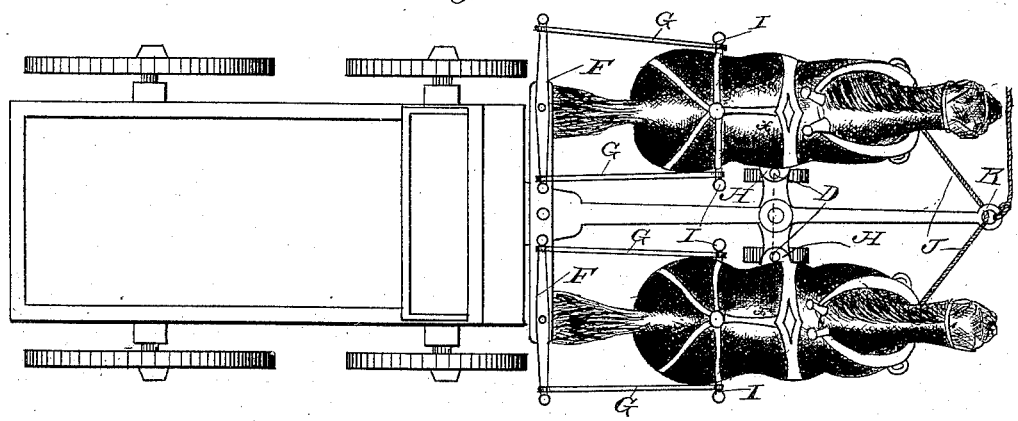
Figure 3:
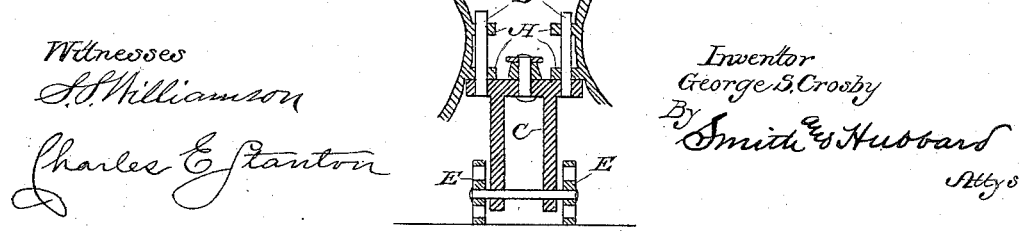

Figure 1 is a side elevation showing a toy vehicle with horses attached thereto in accordance with my improvement; Fig. 2, a plan view of the same, and Fig. 3 a cross-section taken at the line $x$ $x$ of Fig. 2.

Similar letters denote like parts in the several figures of the drawings.

A is any ordinary toy cart, and B the pole.

C is a truck swiveled to the forward extremity of the pole, and having upwardly projecting therefrom pins D.

E are wheels journaled on an axle at the bottom of the truck.

F are whiffletrees having elastic traces G.

The horses or other animals are cast with lugs H projecting laterally from their sides nearest the pole. In attaching the animals to the wagon the lugs H are placed over the pins D, thereby swiveling the animals to the truck. The elastic traces are then hooked over pins I, extending from the flanks of the animals.

A cord, J, is passed through the eye K in the truck and attached to the breasts or other suitable portions of the animals, so as to keep the latter in place. In drawing my improved toy around, the feet of the animals do not touch the ground, and the truck turns readily. The elastic traces permit the free movement of the animals, and cause the latter to assume their normal position after turning.

Having thus described my invention, what I claim as new, and desire to secure by Letters Patent, is—

1. In a toy-vehicle team, a pole made in two pieces, the forward part secured to a truck and pivoted to the rear portion, as specified.

2. In a toy-vehicle team, a pole made in two pieces, the forward part being secured to the truck which supports the animals and pivoted to the rear portion, as shown.

3. A toy-vehicle team consisting of a pair of animals pivotally attached to a truck swiveled to the pole, said animals being attached to the whiffletrees by elastic traces, substantially as described.

4. In a toy-vehicle team, the combination, with a truck swiveled to the pole and provided with wheels and upwardly-projecting pins, of the animals having lugs extending from their sides, substantially as set forth.

5. The combination of the truck, swiveled to the pole and having upwardly-projecting pins, animals having laterally-projecting lugs, and whiffletrees provided with elastic traces, substantially as shown and described.

In testimony whereof I affix my signature in presence of two witnesses.

GEORGE S. CROSBY.

Witnesses:
S. S. WILLIAMSON,
HENRY CAMPBELL.